Feb. 1, 1944.　　　P. A. JACOBSON　　　2,340,755
MACHINE FOR REMOVING CASINGS FROM SAUSAGES AND THE LIKE
Filed Aug. 26, 1940　　　3 Sheets-Sheet 1
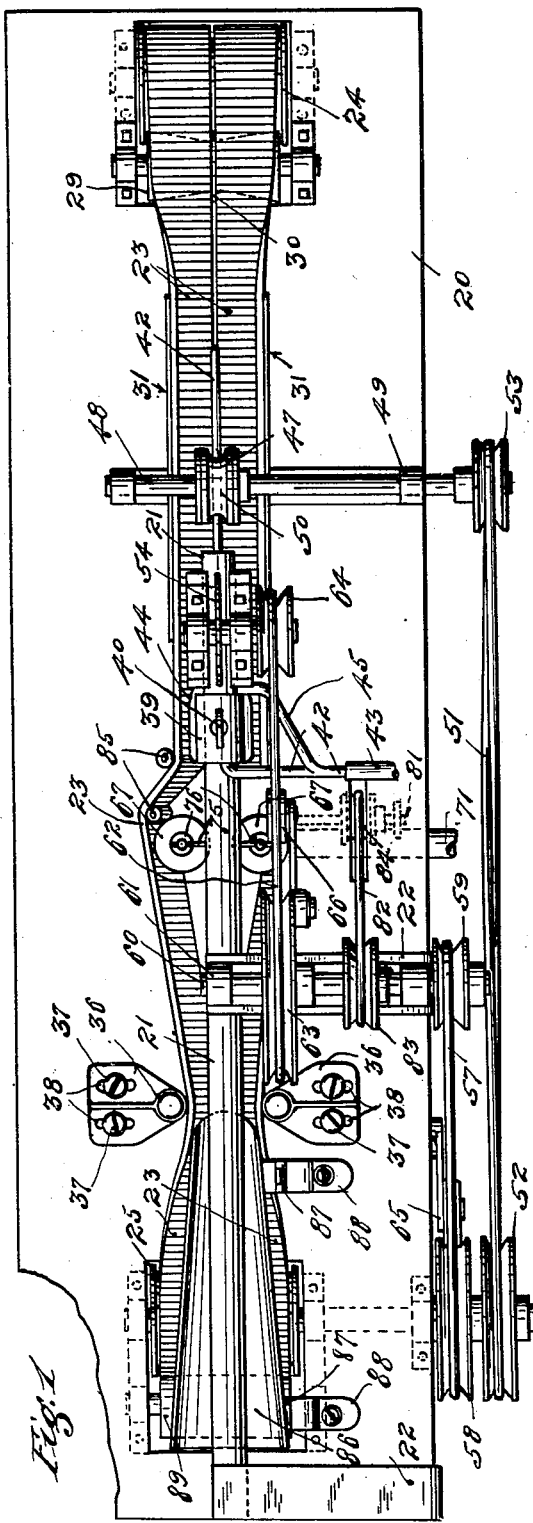
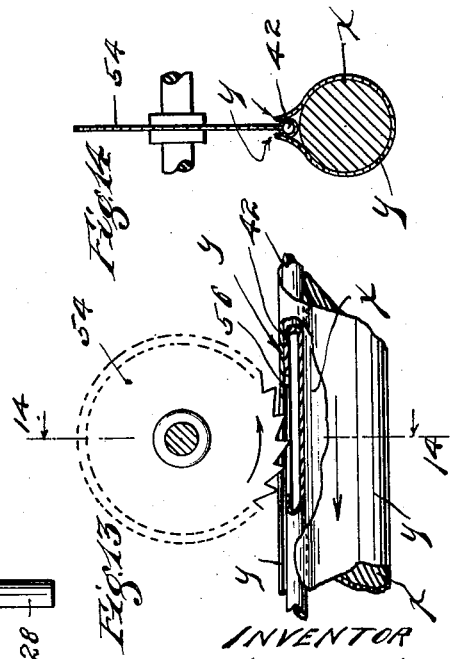
INVENTOR
Parker A. Jacobson
By his Attorney
Harry N. Kilson

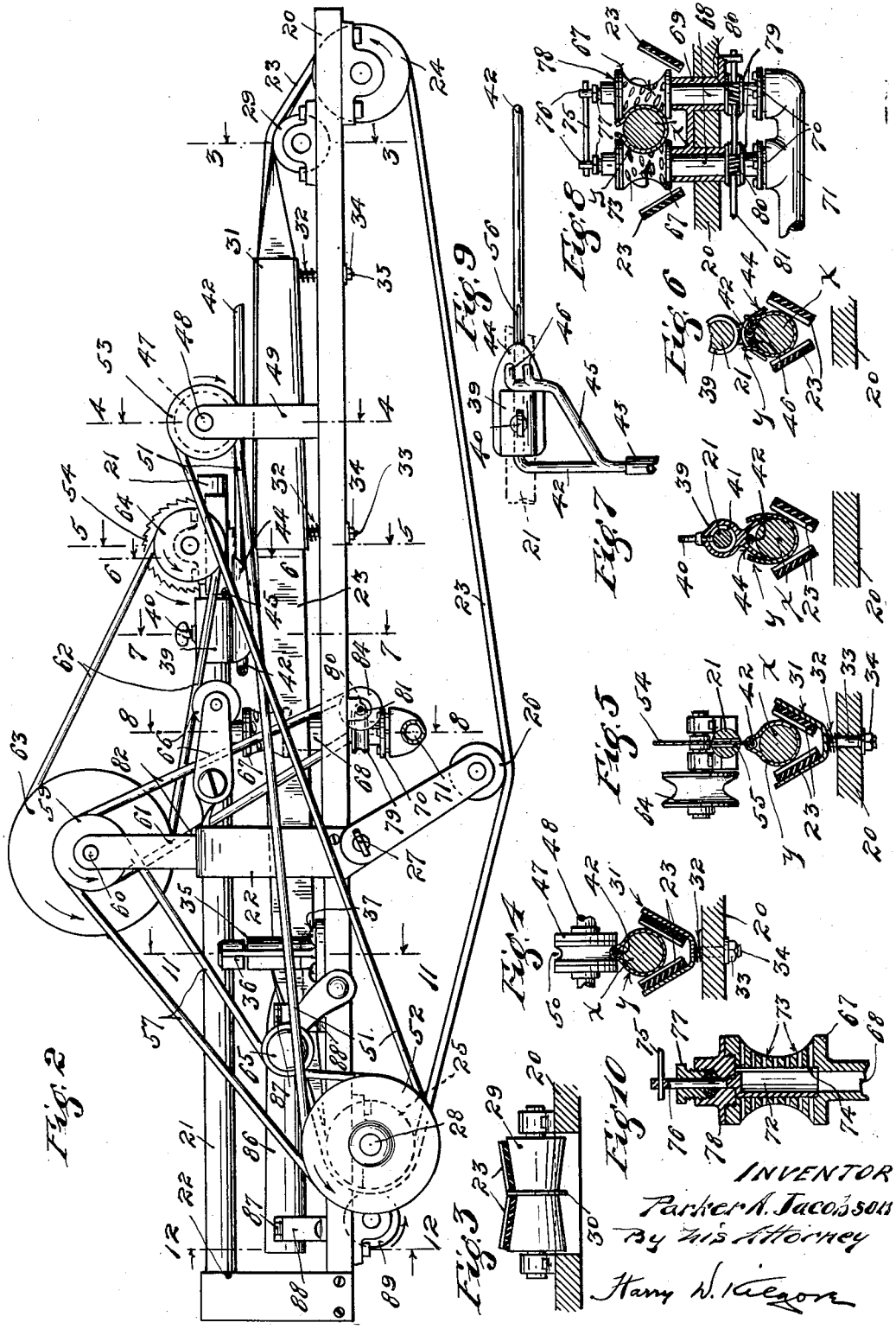

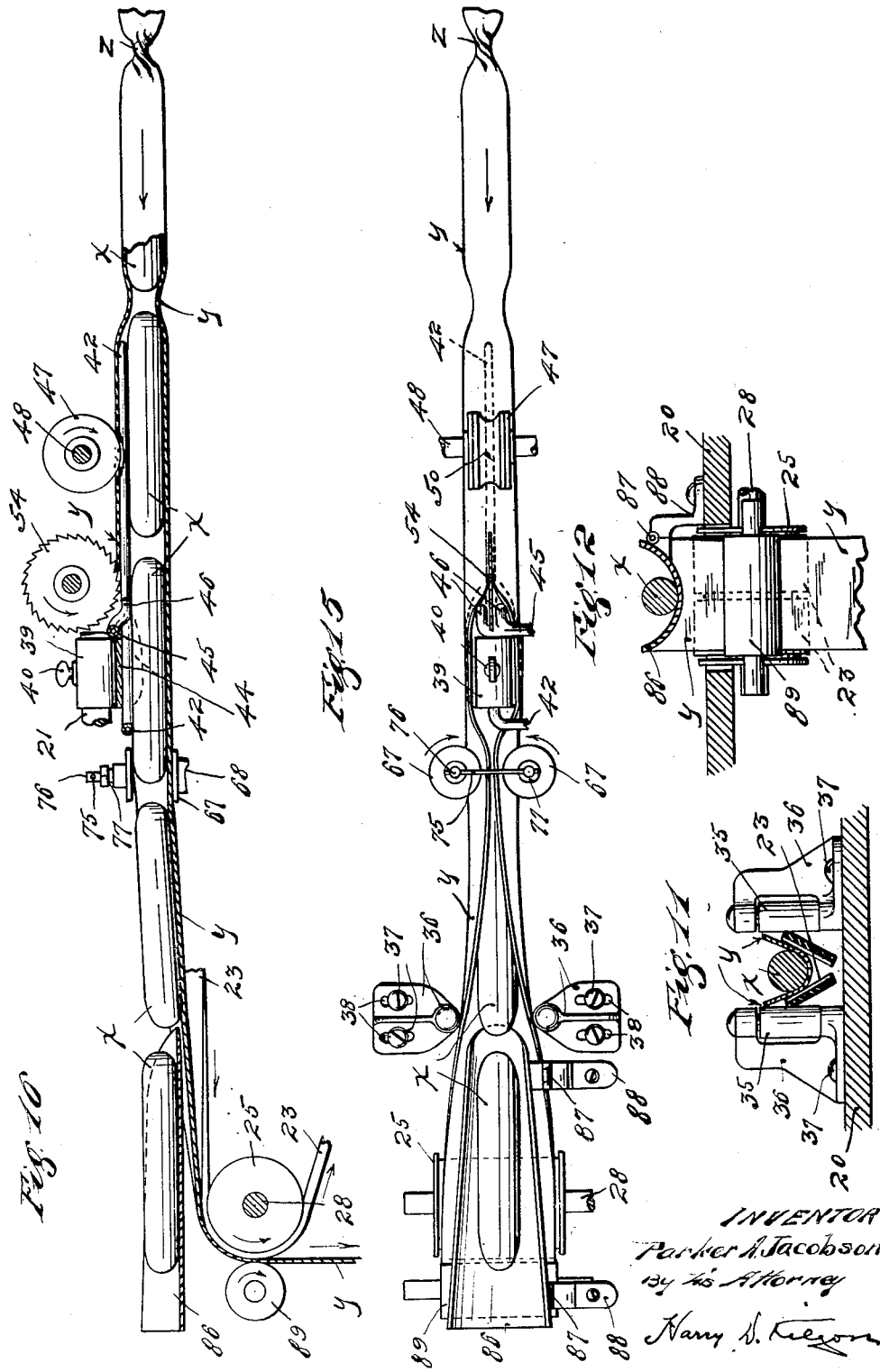

Patented Feb. 1, 1944

2,340,755

UNITED STATES PATENT OFFICE 2,340,755

MACHINE FOR REMOVING CASINGS FROM SAUSAGES AND THE LIKE

Parker A. Jacobson, Evanston, Ill.

Application August 26, 1940, Serial No. 354,215

12 Claims. (Cl. 17—1)

My present invention has for its object to provide a highly efficient machine for removing the casings from stuffing therein, such as sausages, frankfurters, wieners and the like.

While the improved machine is intended for general use in removing casings stuffed with sausage, it is especially intended for use in removing artificial casings from sausage made of paper, Cellophane or the like.

It is well known that, while the trade does not seriously object to animal casings, it does object to artificial casings and it is now the general practice for sausage manufacturers to remove artificial casings from the sausage with which they are stuffed and sell the sausage as "skinless sausage."

In view of this objection by the trade to artificial sausage casings, it is now necessary for the manufacturer to remove such casings by hand, which is an expensive and tedious process.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved machine;

Fig. 2 is a side elevation;

Figs. 3 to 8, inclusive, are detail views partly in elevation and partly in transverse vertical section taken on the lines 3—3, 4—4, 5—5, 6—6, 7—7, and 8—8 of Fig. 2, respectively;

Fig. 9 is a plan view of the needle-like leader and casing stripper;

Fig. 10 is a fragmentary detail of one of the vacuum pulleys in central vertical section;

Figs. 11 and 12 are detail views partly in elevation and partly in section taken on the lines 11—11 and 12—12 of Fig. 2, respectively;

Fig. 13 is a fragmentary detail view partly in side elevation and partly in section of the saw, leader and a link of sausage;

Fig. 14 is a fragmentary detail view partly in front elevation and partly in section taken on the line 14—14 of Fig. 13;

Fig. 15 is a plan view of the parts shown in Fig. 16; and

Fig. 16 is a fragmentary view partly in side elevation and partly in longitudinal vertical section showing the travel of the linked sausages through the machine.

The numeral 20 indicates a long table supported on legs or in any other suitable manner, not shown. A long horizontally disposed body member, as shown a rod 21, overlies the table 20 and extends longitudinally thereof. This rod 21 is rigidly secured to the table 20 by a pair of angle brackets 22 and supported thereby in a raised position above said table and the space between said rod and table is unobstructed.

A pair of edgewise spaced conveyor belts 23, the outer or operative faces of which are corrugated, have their corrugations extending transversely thereof. At least the corrugated surfaces of the belts 23 are made of rubber or any other material that is relatively soft and that will frictionally hold a sausage longitudinally thereof. These belts 23 run over front and rear flanged pulleys 24 and 25, respectively. Said pulleys 24 and 25 are journaled in bearings on the under side of the table 20 and work in apertures in said table through which the belts 23 travel. The upper runs of the belts 23 overlie the table 20 and the lower runs thereof underlie said table and run over a belt tightener 26. This belt tightener 26 is adjustably secured to the front bracket 22 by a thumb screw 27. The shaft 28 to which the rear pulley 25 is secured is driven by suitable connections from an electric motor, not shown.

The belts 23, during their upper run over the table 20 are turned and held in V-shaped arrangement with their corrugated surfaces in opposing relation. Upon leaving the front pulley 24, the belts 23 run over a pulley 29 journaled in bearings on the table 20. The face of the pulley 29 is in the form of a pair of truncated cones with a stop flange 30 therebetween. See Fig. 3. This pulley 29 starts turning movement of the belts 23 into their V-shape arrangement. From the pulley 29 the belts 23 enter a trough-like platform 31, the sides of which are in upwardly diverging relation. This platform 31 completes the turning of the belts 23 into their opposing relation and said belts travel on the inclined sides thereof. The platform 31 is relatively long and its rear end portion extends under the front end portion of the body member 21. Said platform 31 is supported, at each end, on a coil spring 32 which rests on the table 20 as a base of resistance. Rigidly secured to each end of the platform 31 is a depending screw-threaded stud 33 that extends axially through the respective spring 32 and a hole in the table 20. A nut 34 and co-operating washer are applied to the lower end portion of each stud 33 and said washer engages the table 20 as a base of resistance. The springs 32 yieldingly support the platform 31 on the table 20 and by adjusting either nut 34 on its stud 33, the respective end of the platform 31 may be raised or lowered relative to the table 20 for a purpose that will presently appear. The upper runs of the belts 23, while still in their opposing relation, pass between a pair of upright guide rolls 35 loosely journaled in brackets 36 on the table 20. These brackets 36 are secured to the table 20 for adjustment toward or from each other by screws 37 that extend through slots 38 in the bases of said brackets. See Figs. 11 and 15. The belts 23, during their travel from the guide rolls 35 to the pulley 25, are turned into their edgewise spaced relation by the time they pass around said pulley.

A barrel 39 is turnably mounted on the body member 21 inwardly of its front end. This barrel 39 is normally rigidly secured to the body member 21 by a thumb-screw 40 which extends into an annular channel 41 in said body member that holds the barrel 39 against endwise movement on the body member 21 and impinges against said body member and holds the barrel 39 from turning thereon.

Rigidly secured to the barrel 39 on the under side thereof is a long horizontally disposed needle-like leader 42. This leader 42 overlies the platform 31 exactly midway between the two belts 23 and its front or free end extends nearly to the front end of said platform. The leader 42 is hollow and affords an air nozzle, for a purpose that will hereinafter appear. Said leader 42, at the rear end of the platform 31, extends laterally to one side of the table 21 and an air hose 43 is attached thereto. This air hose 43 leads from a suitable source of air supply under pressure not shown.

Also rigidly secured to the barrel 39 is a casing stripper 44 in the form of a pair of fins or flanges, the front end of said stripper being tapered and terminating in a blunt nose. The fins of the stripper 44 are in downwardly diverging relation on each side of the leader 42. A branch air pipe 45 leads from the intake end of the leader 42 and its front end portion extends in front of the barrel 39 transversely over the stripper 44 and terminates in dual air nozzles 46. These nozzles 46 extend through the stripper 44 with their delivery end portions extending parallel to the leader 42, and one on each side thereof. See Figs. 6 and 9.

A driven casing pulling roll 47 is secured to a long shaft 48 that extends transversely over the leader 42 and is spaced forward of the stripper 44. The shaft 48 is journaled in a bearing bracket 49 secured to the table 20. The pulling roll 47 has a rubber face in which is formed an annular groove 50 which fits over the leader 42. See Fig. 4. The pulling roll shaft 48 is driven from the driving shaft 28 by a crossed belt 51 that runs over a large pulley 52 on the shaft 28 and a small pulley 53 on the shaft 48.

A saw 54 for longitudinally slitting a sausage casing is journaled in bearings on the body member 21 and works in a slot 55 that extends longitudinally in said body member. A long slot 56 is formed in the upper surface of the leader 42 to afford clearance for the teeth of the saw 54 that extend slightly therein during the rotation thereof. See Figs. 5, 13 and 14. Driving connections for the saw from the driving shaft 28 are as follows, to wit: A belt 57 runs over a large pulley 58 on the shaft 28 and a small pulley 59 on an idle shaft 60 journaled in a bearing bracket 61 on the front bracket 22, and a belt 62 that runs over a large pulley 63 on the idle shaft 60 and a small pulley 64 on the shaft of the saw 54. Belt tighteners 65 and 66 are provided for the belts 57 and 62, respectively. It is highly important to note that the saw 54 turns in an opposite direction from the direction of travel of a stuffed casing through the machine, as will presently appear.

A pair of co-operating vertically disposed vacuum pulleys 67 are located back of the barrel 39 and have formed therewith depending tubular shafts 68 journaled in bearings 69 on the table 20. The shafts 68 extend below the table 20 and are turnably mounted in stuffing boxes 70 on a pipe 71 that leads from a vacuum pump, not shown.

A stationary valve 72 is mounted in each pulley 67 and a plurality of holes 73 are formed in the periphery of each of said pulleys and extend to the respective valve 72. The valves 72 are hollow and the lower ends thereof are open and in communication with the hollow shafts 68. In each valve 72 is a longitudinally extended slot 74 with which the holes 73 are successively brought into communication during the rotation of the pulleys 67. The valves 72 are held from turning by a rod 75, the end portions of which extend through holes in stems 76 formed with the upper ends of said valves in axial alignment therewith. These stems 76 extend through stuffing boxes 77 on displaceable screw caps 78 on the upper ends of the pulleys 67. The peripheries of the pulleys 67 are grooved for a stuffed casing to pass therebetween, and engage the same with a pulling action.

The pulleys 67 are driven in opposite directions by the following connections, to wit: on each shaft 68 below the table 20 is a worm gear 79 with which a worm 80 meshes. The worms 80 are secured to a shaft 81 journaled in bearings on the under side of the table 20, and a belt 82 runs over a pulley 83 on the idle shaft 60 and a relatively small pulley 84 on the shaft 81. Directional rolls 85 direct the conveyor belts 23 past the vacuum pulleys 67.

A scoop 86 rearwardly of the guide rolls 35 is provided for separating the sausage from the casing thereof. This scoop 86 has a blunt nose and is in the form of a trough that overlies the belts 23 and extends longitudinally thereof. Said scoop 86 is hinged at 87 to a pair of brackets 88 on the table 20 for rising movement transversely of the belts 23.

Co-operating with the belts 23, to longitudinally pull a stuffed casing as said belts pass over the pulley 25, is a roll 89, the periphery of which closely engages the corrugated faces of said belts. This roll 89 is idle and journaled in bearings on the under side of the table 20.

*Operation*

It may be assumed that the driven members of the machine are being rotated in the direction of the arrows associated therewith from an electric motor, not shown. It may also be assumed that the required air pressure is being delivered to the leader 42 and the nozzles 46 from a suitable source of supply and that a partial vaccum is being created in the valves 72 for the pulleys 67 by a suitable vacuum pump, not shown.

The sausage x shown in the drawings after being stuffed in a casing y has been divided into links by twisting the casing y as indicated at z.

To start the operation of removing by peeling the casing y from the sausage x, one end portion of a long string of linked sausage is laid on the belts 23 over the roll 29 and between the belts 23 on the platform 31. Next, the leader 42 is inserted into the respective end of the sausage between the top thereof and the casing y. The casing y is then fed between the leader 42 and the roll 41. At the completion of this hand operation, the stuffed casing is fed endwise by the belts 23 and the roll 41 to the saw 54. During the feeding of the sausage to the saw 54, the leader 42 has been advancing between the sausage x and the casing y and as heretofore stated, the delivery end of said leader is quite a distance from the saw 54. The object of the leader 42 is, first to start the initial peeling of the casing y from the sausage; second, to guide the sausage to the saw 54; third, to discharge compressed air into the casing y and build up an air pressure therein to further start the peeling of the casing y from the sausage x; and fourth, to untwist or to assist in untwisting the casing y between the several links. The attendant of the machine must untwist or assist the air pressure in the casing y in untwisting the casing between the links before the leader 42 leaves one link and enters the next.

The roll 41 tightly presses the casing y onto the top and sides of the leader 42 and thereby produces a grip on said casing and assists the belts 23 in feeding the stuffed casing through the machine.

The casing y as the same is fed thereto is longitudinally slit thereby at the top of the leader 42. The purpose of rotating the saw 54 in the opposite direction of the travel of the sausage in the machine is to lift the longitudinal edge portions of the casing y and thereby assist the stripper 44 to enter between the casing y and the sausage x. Jets of air from the nozzles 46 directed between the sausage x and the loose longitudinal edge portions of the casing y lift said edge portions and further assist the stripper 44 in entering between the casing y and the sausage x.

By vertically adjusting the platform 31, the same may be positioned to bring the top of a sausage x, being moved longitudinally of the leader 42, close to the under side thereof and to adjust said platform for sausages of different dimensions.

As a sausage is moved past the stripper 44, the fins or flanges thereof further peel the casing y from the sausage x. From the stripper 44 the sausage passes between the rotating vacuum pulleys 67 that further assist the belts 23 in conveying the sausage through the machine. Partial vacuum in the holes 73 in the pulleys 67 produces suction on the casing that starts at the top thereof and moves downwardly on each side thereof and thereby further peels the casing y from the sausage x.

When the sausage passes from between the vacuum pulleys 67, the casing y will have been peeled from the sausage x at least to the center thereof. The end of the casing y, upon reaching the rear end of the machine, is spread out flat and inserted between the belts 23 and the pressure roll 89. The pull on the casing y by the belts 23 and co-operating roll 89, after said casing passes from between the guide rolls 35, strips the casing y from the sausage x. As the casing y, from the guide rolls 35, passes under the scoop 86, said scoop lifts the sausage x and separates the same from its casing y.

The purpose of hinging the scoop 86 is to permit the same to be lifted and thereby facilitate the initial feeding of the end of the casing between the belts 23 and the pressure roll 89.

The skinned sausages y, as they enter the scoop 86, may be removed therefrom by the operator or by suitable mechanical means and for the purpose of this case it is not thought necessary to show the same.

By loosening the thumb-screw 40, the barrel 39 may be turned about the axis of the body member 21 and thereby lift the leader 42 and the stripper 44 to facilitate the initial feeding of the front end of a stuffed casing into the machine.

From the foregoing, it must be evident that the invention herein disclosed and claimed is capable of a large range of modifications within the spirit of the invention.

What I claim is:

1. In a machine of the kind described, means for feeding a stuffed casing through the machine, means for slitting the casing by a stroke first in the direction opposite to the movement of the casing and then outwardly thereof, and means for removing the slit casing from the stuffing.

2. In a machine of the kind described, means for feeding a stuffed casing through the machine, a rotary cutter for slitting the casing, said cutter being rotated in the opposite direction from that in which the casing travels and thereby adapted to lift the edge portions of the slit casing as said casing is slit by the cutter, and means for peeling the slit casing from the stuffing.

3. In a machine of the kind described, means for feeding a stuffed casing through the machine, a circular saw for slitting the casing, said saw being rotated in the opposite direction from that in which the casing travels and thereby adapted to lift the edge portions of the casing as said casing is slit by the saw, and means for peeling the slit casing from the stuffing.

4. In a machine of the kind described, means for feeding a stuffed casing endwise through the machine, a circular saw for slitting the casing, a stripper for peeling the slit casing from the stuffing, said saw being rotated in the opposite direction from that in which the casing travels and thereby being adapted to lift the edge portions of the casing as said casing is slit by the saw to permit the stripper to enter between the casing and the stuffing.

5. In a machine of the kind described, means for feeding a stuffed casing through the machine, a needle-like leader extending between the casing and the stuffing, a driven roll for pressing the casing onto the leader and feeding the same longitudinally thereon, means for slitting the casing separated from the stuffing by the leader, and means for peeling the slit casing from the stuffing.

6. In a machine of the kind described, a pair of driven belts for conveying a stuffed casing through the machine, a platform for guiding sections of the belts in opposing V-shape arrangement and holding said casing therebetween, a needle-like leader extending longitudinally over the platform and midway between the belts thereon, said leader extending between the casing and stuffing, means for slitting the casing separated from the stuffing by the leader, and means for peeling the slit casing from the stuffing.

7. The structure defined in claim 6 which further includes spring means for raising or lowering the platform relative to the leader.

8. In a machine of the kind described, means for feeding a stuffed casing through the machine, means for slitting the casing, and a stripper for peeling the slit casing from the stuffing, said stripper including a pair of forwardly tapered and transversely diverging fins.

9. The structure defined in claim 8 which further includes an air nozzle through which air under pressure is discharged under the longitudinal edge portions of the slit casing to lift the same and thereby facilitate the entrance of the stripper between the casing and stuffing.

10. In a machine of the kind described, means for feeding a stuffed casing through the machine, means for slitting the casing, and means for producing suction on the slit casing to separate the same from the stuffing.

11. In a machine of the kind described, means for feeding a stuffed casing through the machine, means for slitting the casing, a pair of grooved vacuum pulleys between which the slit casing travels, said pulleys having holes in their peripheries, means for producing a partial vacuum in said holes, and valve mechanism for closing said holes and periodically opening the same whereby suction is produced on the casing to pull the same from the stuffing.

12. In a machine of the kind described, means for feeding a stuffed casing through the machine, means for slitting the casing, a pair of grooved vacuum pulleys between which the slit casing travels, said pulleys having holes in the peripheries, means for producing a partial vacuum in the holes, and valve mechanism for closing said holes and periodically opening the same, said holes and valve mechanism being constructed and arranged so that said holes start to open at the slit edges of the casing and successively open therefrom circumferentially around the casing, whereby the casing is peeled circumferentially from the stuffing.

PARKER A. JACOBSON.